TIME DELAY CIRCUIT FOR BRIEFLY HOLDING A SELECTIVE CALL TRANSMITTER ENERGIZED

Filed Aug. 20, 1964

Inventor
ROSS E. RUTHENBERG
By Mueller & Aichele
Attys.

3,304,501

TIME DELAY CIRCUIT FOR BRIEFLY HOLDING A SELECTIVE CALL TRANSMITTER ENERGIZED

Ross E. Ruthenberg, Blue Island, Ill., assignor to Motorola, Inc., Franklin Park, Ill., a corporation of Illinois
Filed Aug. 20, 1964, Ser. No. 390,867
12 Claims. (Cl. 325—186)

This invention relates generally to control systems, and more particularly to a transmitter control system including a delay circuit for holding the transmitter energized for a predetermined time interval.

In two-way radio communication equipment, a control system may be provided for selectively rendering the transmitter and receiver operative. The receiver is normally operative to monitor the channel, or is rendered operative by a control tone from the transmitter to another unit, and when it is desired to transmit the control system energizes the power supply so that the transmitter is conditioned for operation. A two-way radio communication system wherein a tone is transmitted to automatically render predetermined receiver of the system operative is described in United States Patent No. 2,974,-221, issued Mar. 7, 1961 to Robert Peth, and assigned to the assignee of the present invention. This patent describes a system using electromagnetic reed devices in the receivers to respond to particular control tones which are continuously applied during a transmission. In order to immediately stop the vibration of the reed at the termination of a transmission, the phase of the transmitted control tone is changed to provide a signal which damps the reed motion.

The system of Patent No. 2,974,221 has been used successfully in commercial equipment by Motorola, Inc., assignee of this patent. The equipment specifically described in the patent, however, includes mechanical relays in the transmitter for connecting the tone oscillator to provide signals of the desired phases, and to cause the transmitter to be held energized for an additional period of time to transmit the damping tone signal. Mechanical relays cause problems because of wear of the mechanical parts and the requirement for adjustment thereof. It is, therefore, desired to substitute solid state switching devices for the mechanical relays. Existing solid state switching devices have not been satisfactory to provide a time delay as required in the above system.

It is, therefore, an object of this invention to provide an improved solid state switching system for communication equipment.

Another object of the invention is to provide a solid state time delay circuit for producing a control potential extending for a predetermined time duration after a control has terminated.

Another object of the invention is to provide a switching system made up entirely of solid state elements for switching signals of two phases from a tone generator and for energizing the transmitter for transmitting one tone for a predetermined time interval after the termination of the primary control.

A feature of the invention is the provision of a solid state switching and control system including a time delay circuit having a transistor and a saturable transformer with one winding responsive to termination of a first control potential to render the transistor conducting to provide a second control potential, and with additional windings causing the transistor to conduct for a predetermined time interval.

Another feature of the invention is the provision of a circuit for producing a control potential of a predetermined duration including a transformer with a saturable core and three windings thereon, and a transistor having an input electrode connected to one winding and an output connected to the second winding, with a control potential being applied to the third winding to saturate the transformer core in one direction, and wherein termination of the control potential triggers the transistor into conduction, and regenerative action through the first and second windings renders the transistor fully conducting until the transformer core is saturated in the opposite direction to cut off the transistor.

Still another feature of the invention is the provision of a control system for a transmitter which applies a control tone during transmissions, wherein a first control potential acts to energize the power supply and connect the tone generator to provide signals of a first phase and to set a time delay circuit, so that at the termination of the first control potential the time delay circuit produces a second control potential having a predetermined time duration. Termination of the first control potential also switches the output of the tone generator so that a second phase is applied therefrom to the transmitter.

The invention is illustrated in the drawing wherein.

In practicing the invention, a control system for a transmitter is provided wherein the transmitter includes a power supply for energizing the same and a tone generator for providing control tones. The transmitter may be part of a two-way unit which also includes a receiver. The control system for the transmitter includes a control unit for providing an actuating potential when it is desired to turn on the transmitter. This may be initiated by a push-to-talk switch associated with a microphone for the transmitter. The actuating potential is applied to the power supply to cause energization thereof and to a solid state switching circuit for applying tone signals of one phase from the tone generator to the transmitter. At the end of the transmission, the actuating potential is terminated and the switching circuit applies a second phase of the tone signal to the transmitter. In order to hold the power supply energized to transmit the second phase of the tone signal, a time delay circuit is provided which includes a transformer having a saturable core and three windings thereon, and a transistor. The actuating potential is applied to the reset winding to reset the transformer core to saturation in one direction. At the termination of the control potential, a pulse is applied from the reset winding to a second feedback winding connected to the base electrode of the transistor to render the transistor conducting. The third or primary winding of the transformer is connected to the collector electrode of the transistor so that current flows therein when the transistor conducts. The primary and feedback windings provide regenerative action to quickly render the transistor fully conducting and the current flow acts to reverse the flux in the transformer core. When the transformer core is saturated in the opposite direction, the regenerative action terminates and the transistor is cut off. The saturation characteristics of the transformer, therefore, control the time duration of the transistor conduction. Conduction of the transistor applies a second actuating potential to the power supply to hold the same energized for this time duration.

Figure 1:
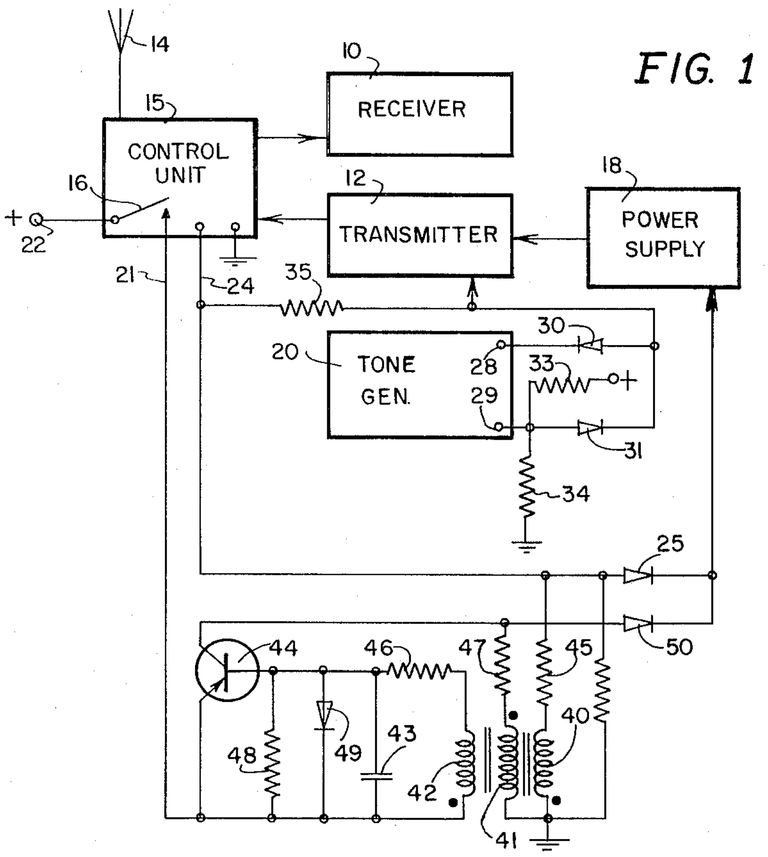
FIG. 1 is a schematic diagram of the system of the invention.

Referring now to the drawing, in FIG. 1 there is illustrated, partially in block diagram and partially in circuit diagram, a two-way radio unit including a receiver 10 and a transmitter 12. The receiver and transmitter operate from a single antenna 14 connected to the transmitter and receiver through control unit 15. A power supply 18 is provided for energizing the transmitter 12, and a tone generator 20 is provided to apply tone signals to the modulator of the transmitter. The transmitter may be used in a system wherein tones are applied simultaneously with audio signals to cause particular receivers to be actuated to receive the transmitted audio signals. The control unit may include a main control switch 16 to energize conductor 21 from the supply voltage source applied to terminal 22. The equipment may be used in a vehicle and the potential applied at terminal 22 may be the battery potential which is of the order of 14 volts.

The control unit 15 may include a microphone or other device for applying modulating signals to the transmitter, and a control switch for causing operation of the transmitter, such as a push-to-talk switch commonly associated with a microphone. When the control switch is operated, conductor 24 is also connected to the supply potential, with this conductor being energized only when the control switch is actuated. The conductor 24 is at ground potential when the control switch is not operated. Conductor 24 is connected through diode 25 to the power supply 18, and when the actuating potential appears on conductor 24, this is applied to the power supply and actuates the same to energize the transmitter 12.

The tone generator 20 includes two outputs which appear at terminals 28 and 29 thereof. The terminal 28 is connected to the transmitter 12 through diode 30, and the terminal 29 is connected to transmitter 12 through diode 31. A positive potential is applied from terminal 28 to the cathode of diode 30, so that when the control switch in the control unit is not actuated and the conductor 24 is at ground potential, diode 30 is cut off. When the supply potential is applied to conductor 24, this exceeds the potential at terminal 28 so that diode 30 conducts to apply tone signals of one phase to the transmitter 12. When the control potential does not appear on conductor 24, diode 31 conducts to apply tone signals of a second different phase to the transmitter 12. This is because the voltage divider including resistors 33 and 34 applies a positive potential to the anode of diode 31, and the cathode thereof is referenced to ground potential through resistor 35 so that the diode conducts to apply tone signals of the second phase from the tone generator to the transmitter 12.

As has been fully described in Patent No. 2,974,221 referred to above, the tone signals applied from terminal 28 are transmitted to actuate reed devices in receivers in the system, so that such receiver operates to reproduce the transmitted signals. At the termination of a transmission, the tone from terminal 29 is transmitted and this has a phase to damp the motion of the reeds to quickly stop vibration thereof. The phase of the tone signal at terminal 29 should lead the tone signal applied from terminal 28 to actuate the reeds by approximately 135 degrees. This is because the vibratory motion of the reeds lags the applied voltage by approximately 45 degrees. Accordingly, when a tone signal leading by 135 degrees is applied, this is effectively 180 degrees out of phase with the reed motion and acts to rapidly stop the same.

Figure 2:
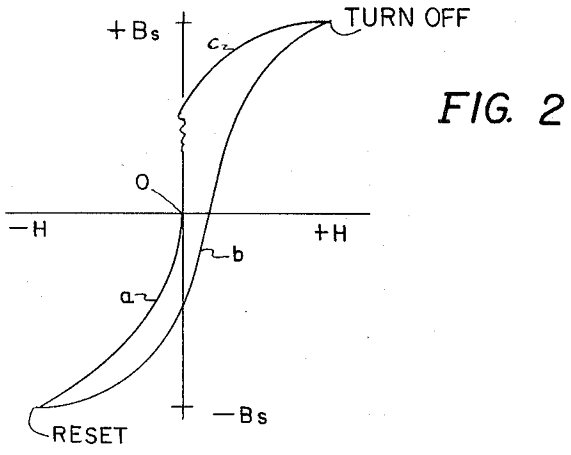
FIG. 2 illustrates the saturation of the core of the transformer of the time delay circuit.

Coupled to the conductor 24 is a time delay circuit including a saturable transformer having a core with windings 40, 41 and 42 thereon, and a semiconductor device 44 coupled to the windings. The windings 40, 41 and 42 are phased as shown by the dots at the ends of the windings. The semiconductor device 44 may be a transistor with base, emitter and collector electrodes. When a potential is applied on conductor 24, this causes current flow through reset winding 40 and resistor 45 in series therewith. This current acts to reset the core of the saturable transformer. FIG. 2 illustrates the condition of the flux in the transformer, and during reset the core is magnetized along line *a* from the O point, to the point marked "reset" which represents saturation of the core in one direction. This is designated as the negative direction and shown as $-B_s$.

When the potential on conductor 24 terminates so that current flow through winding 40 tends to stop, a pulse is developed across reset winding 40 and is induced in feedback winding 42. This will apply a negative pulse to the base of transistor 44, being applied from winding 42 through resistor 46. This negative pulse will render the transistor 44 conducting so that current will flow from the emitter to the collector and through resistor 47 and transformer primary winding 41 to ground. Primary winding 41 is inductively coupled to feedback winding 42 to provide regenerative action so that the transistor 44 is quickly rendered fully conducting and continues to conduct. The current thus flowing through winding 41 acts to reverse the flux in the transformer core so that the flux therein builds up as indicated by the line *b* in FIG. 2 to the point of saturation in the opposite direction. In the "reset" condition, the flux in the transformer core is at a negative saturation value, and the flux will reverse and build up until it reaches the positive saturation value designated "turn off." At this point there will be very little coupling between the windings 41 and 42 so that the induced negative potential is removed from the base of transistor 44, and the transistor is cut off. This terminates current flow through the winding 41, and the transformer's magnetic field collapses along line *c* to the area of point O.

The emitter electrode of transistor 44 is connected to the supply potential through connector 21, so that when the transistor conducts, a conductive path is provided through the transistor and to the collector electrode thereof, and through diode 50 to the power supply 18. This applies the same potential to the power supply as was applied by conductor 24, and holds the power supply energized. The diode 50, like the diode 25, provides isolation so that the potential at the collector of transistor 44 is not applied to conductor 24, or vice versa.

The time duration that the power supply is held energized depends upon the time required to reverse the saturation of the transformer, as has been described. The transformer may be constructed so that a time duration of the order of 150 milliseconds is provided, this being found to be adequate time to damp out the motion of the reeds responding to the tone signal. The transformer remains in the area of point O until the actuating potential is again applied to conductor 24 so that current flows through resistor 45 and coil 40 to reset the core to the negative saturated condition. The flux in the transformer core changes along the path designated *a* and again returns to the negative saturated condition designated "reset" in FIG. 2.

The time duration is determined approximately by the formula $$t=\frac{N_p A_c 2B_s}{E_p}$$

wherein $N_p$ is the number of turns in the primary winding 41 of the transformer, $A_c$ is the effective cross sectional area of the core, $B_s$ is the saturation flux density of the core, and $E_p$ is the voltage across the primary winding. This primary winding 41, therefore, basically controls the time for reversal of the flux of the transformer core between the "reset" and "turn off" points. The primary voltage, $E_p$, is a function of the core characteristics, resistor 47, reflected load from the feedback winding 42, and supply voltage from conductor 21. $E_p$, and hence time delay, is therefore affected to one degree or another by all these variables.

Capacitor 43 is provided between the base and emitter electrodes of transistor 44 to prevent unintentional triggering of the transistor 44. When the main switch 16 is closed and a voltage is applied to the emitter electrode of transistor 44, capacitive couplings through the leads and windings of the transformer may provide sufficient current to cause the transistor 44 to start to conduct, and the regenerative action through windings 41 and 42 cause the conduction to continue through the 150 milliseconds time cycle. Similar action can result from stray radio frequency fields which may be present. The capacitor 43 swamps out the stray capacity and makes it necessary to apply a relatively large triggering pulse to initiate conduction in transistor 44. This does not affect the desired action as the pulse induced in winding 42, when current flow in winding 40 terminates, is sufficiently large to charge capacitor 43 and render transistor 44 conducting.

Diode 49 provides a path for current flow in the feedback winding 42 when the reset current initially flows through winding 40. This current induces a voltage in winding 42 which back biases the base to emitter junction of the transistor 44. This voltage can reach a value that might damage the transistor. The diode 49 clamps the voltage between the base and emitter at a value below 2 volts, so that this problem is eliminated.

The control system of the invention uses only solid state components and is not subject to wear or misadjustment. The time delay circuit causes the transmitter to be energized for the additional time required to transmit a phase shifted tone signal so that motion of reeds in receivers is damped out. The system is not critical of construction or adjustment.

I claim:

1. A control system for a transmitter which includes a power supply for energizing the transmitter and a tone generator for providing first and second phases of a control tone, said control system including in combination, actuating means coupled to the power supply and applying a first control potential thereto for causing energization of the transmitter, delay means including a transistor and a saturable transformer for controlling conduction of said transistor, said delay means being responsive to termination of the first control potential for applying a second control potential to the power supply for a predetermined time duration after said first control potential is terminated to hold the transmitter energized for such predetermined time duration, and switching means connected to said actuating means and coupling the tone generator to the transmitter, said switching means being responsive to said first control potential to apply tone signals of the first phase from the generator to the transmitter and to apply tone signals of the second phase from the generator to the transmitter in the absence of said first control potential.

2. A control system for a transmitter which includes a power supply for energizing the transmitter and a tone generator providing first and second phases of a control tone, said control system including in combination, actuating means providing a first control potential to condition the transmitter for operation, said actuating means being coupled to the power supply and applying said first control potential thereto for causing energization of the transmitter, delay means coupled to said actuating means and including a transistor and a saturable transformer for controlling conduction of said transistor, said saturable transformer including a first winding coupled to said actuating means for receiving said first control potential and a second winding coupled to said transistor, said second winding applying a voltage to said transistor for rendering the same conducting to provide a second control potential which continues for a predetermined time duration in response to termination of said first control potential, said delay means being coupled to the power supply and applying said second control potential thereto to hold the transmitter energized for said predetermined time duration, and switching means coupling the tone generator to the transmitter and responsive to said first control potential to apply tone signals of the first phase from the generator to the transmitter, said switching means applying tones of the second phase from the generator to the transmitter in the absence of said first control potential.

3. A control system for a transmitter which includes a power supply for energizing the transmitter and a tone generator providing first and second phases of a control tone, said control system including in combination, actuating means providing a first control potential to condition the transmitter for operation, said actuating means being coupled to the power supply and applying said first control potential thereto for causing energization of the transmitter, delay means coupled to said actuating means and including a transistor and a saturable transformer having a core and first, second and third windings thereon, said first winding being coupled to said actuating means for receiving said first control potential and acting to saturate said core in one direction, and second winding being coupled to said transistor and applying a voltage thereto for rendering the same conducting in response to termination of said first control potential, said third winding also being coupled to said transistor and providing regenerative action through said second winding to cause said transistor to remain conducting until said transformer core is saturated in the opposite direction, said transistor when conducting providing a second control potential which continues for a predetermined time duration, said delay means being coupled to the power supply and applying said second control potential thereto to hold the transmitter energized for said predetermined time duration, and switching means coupling the tone generator to the transmitter and responsive to said first control potential to apply tone signals from the generator of the first phase to the transmitter, said switching means applying tones of the second phase from the generator to the transmitter in the absence of said first control potential.

4. A control system for a transmitter which includes a power supply for energizing the transmitter and a tone generator providing first and second phases of a control tone, said control system including in combination, actuating means providing a first control potential to condition the transmitter for operation, said actuating means being coupled to the power supply and applying said first control potential thereto for causing energization of the transmitter, delay means coupled to said actuating means and including a transistor having base, emitter and collector electrodes and a saturable transformer having a core and first, second and third windings thereon, said first winding being coupled to said actuating means for receiving said first control potential and acting to saturate said core in a first direction, said second winding being coupled to said base electrode of said transistor for applying a voltage thereto for rendering the same conducting in response to termination of said first control potential, means connected to said emitter electrode of said transistor for applying a potential thereto so that a second control potential appears at said collector electrode when said transistor conducts, said transformer including a third winding coupled to said collector electrode of said transistor and providing regenerative action through said second winding to cause said transistor to remain conducting until said transformer core is saturated in the opposite direction so that said second control potential appears at said collector electrode for a predetermined time duration, said collector electrode of said transistor being coupled to the power supply and applying said second control potential thereto to hold the transmitter energized for said predetermined time duration, and switching means coupling the tone generator to the transmitter and responsive to said first control potential to apply tone signals from the generator of the first phase to the transmitter, said switching means applying tones of the second phase from the generator to the transmitter in the absence of said first control potential.

5. A control system for a transmitter which includes a power supply for energizing the transmitter and a tone generator providing first and second phases of a control tone, said control system including in combination, actuating means providing a first control potential to condition the transmitter for operation, said actuating means being coupled to the power supply and applying said first control potential thereto for causing energization of the transmitter, delay means coupled to said actuating means and including a transistor having base, emitter and collector electrodes and a saturable transformer having a core and first, second and third windings thereon, said first winding being coupled to said actuating means for receiving said first control potential and acting to saturate said core in a first direction, said second winding being coupled to said base electrode of said transistor for applying a voltage thereto for rendering the same conducting in response to termination of said first control potential, means connected to said emitter electrode of said transistor for applying a potential thereto so that a second control potential appears at said collector electrode when said transistor conducts, said transformer including a third winding coupled to said collector electrode of said transistor and providing regenerative action through said second winding to cause said transistor to continue conduction, with the flux in said transformer core reversing and increasing until said core is saturated in the opposite direction to stop the regenerative action and cut off said transistor, so that said second control potential appears at said collector electrode for the predetermined time duration while said transistor conducts, said collector electrode of said transistor being coupled to the power supply and applying said second control potential thereto to hold the transmitter energized for said predetermined time duration, and switching means coupling the tone generator to the transmitter and responsive to said first control potential to apply tone signals from the generator of the first phase to the transmitter, said switching means applying tones of the second phase from the generator to the transmitter in the absence of said first control potential.

6. A control system for a transmitter which includes a power supply for energizing the transmitter and a tone generator providing first and second phases of a control tone, said control system including in combination, actuating means providing a first control potential to condition the transmitter for operation, said actuating means being coupled to the power supply and applying said first control potential thereto for causing energization of the transmitter, delay means coupled to said actuating means and including a transistor having base, emitter and collector electrodes and a saturable transformer having a core and first, second and third windings thereon, said first winding being coupled to said actuating means for receiving said first control potential and acting to saturate said core in a first direction, said second winding being coupled to said base electrode of said transistor for applying a voltage thereto for rendering the same conducting in response to termination of said first control potential, capacitor means and rectifier means connected between said base and emitter electrodes of said transistor, means connected to said emitter electrode of said transistor for applying a potential thereto so that a second control potential appears at said collector electrode when said transistor conducts, said transformer including a third winding coupled to said collector electrode of said transistor and providing regenerative action through said second winding to cause said transistor to continue conduction, with the flux in said transformer core reversing and increasing until said core is saturated in the opposite direction to stop the regenerative action and cut off said transistor, so that said second control potential appears at said collector electrode for the predetermined time duration while said transistor conducts, said collector electrode of said transistor being coupled to the power supply and applying said second control potential thereto to hold the transmitter energized for said predetermined time duration, and switching means coupling the tone generator to the transmitter and responsive to said first control potential to apply tone signals from the generator of the first phase to the transmitter, said switching means applying tones of the second phase from the generator to the transmitter in the absence of said first control potential.

7. A control system for a transmitter which includes a power supply for energizing the transmitter, said control system including in combination, actuating means providing a first control potential to condition the transmitter for operation, said actuating means being coupled to the power supply and applying said first control potential thereto for causing energization of the transmitter, and delay means coupled to said actuating means and including a transistor and a saturable transformer for controlling conduction of said transistor, said saturable transformer including a first winding coupled to said actuating means for receiving said first control potential and a second winding coupled to said transistor, said second winding applying a voltage to said transistor for rendering the same conducting to provide a second control potential which continues for a predetermined time duration in response to termination of said first control potential, said delay means being coupled to the power supply and applying said second control potential thereto to hold the power supply energized for said predetermined time duration.

8. A control system for a transmitter which includes a power supply for energizing the transmitter, said control system including in combination, actuating means providing a first control potential to condition the transmitter for operation, said actuating means being coupled to the power supply and applying said first control potential thereto for causing energization of the transmitter, and delay means coupled to said actuating means and including semiconductor means having input and output electrodes and a saturable transformer having a core and first, second and third windings thereon, said first winding being coupled to said actuating means for receiving said first control potential and acting to saturate said core in one direction, said second winding being coupled to said input electrode of said semiconductor means and applying a voltage thereto for rendering the same conducting in response to termination of said first control potential, said third winding being coupled to said output electrode of said semiconductor means and providing regenerative action through said second winding to cause said semiconductor means to remain conducting until said transformer core is saturated in the opposite direction, said semiconductor means when conducting providing a second control potential which continues for a predetermined time duration, said delay means being coupled to the power supply and applying said second control potential thereto to hold the transmitter energized for said predetermined time duration.

9. A control system for a transmitter which includes a power supply for energizing the transmitter, said control system including in combination, actuating means providing a first control potential to condition the transmitter for operation, said actuating means being coupled to the power supply and applying said first control potential thereto for causing energization of the transmitter, delay means coupled to said actuating means and including a transistor having base, emitter and collector electrodes and a saturable transformer having a core and first, second and third windings thereon, said first winding being coupled to said actuating means for receiving said first control potential and acting to saturate said core in a first direction, said second winding being coupled to said base electrode of said transistor for applying a voltage thereto for rendering the same conducting in response to termination of said first control potential, means connected to said emitter electrode of said transistor for applying a potential thereto so that a second control potential appears at said collector electrode when said transistor conducts, said transformer including a third winding coupled to said collector electrode of said transistor and providing regenerative action through said second winding to cause said transistor to continue conduction, with the flux in said transformer core reversing until said core is saturated in the opposite direction to stop the regenerative action and cut off said transistor, so that said second control potential appears at said collector electrode for the predetermined time duration while said transistor conduits, said collector electrode of said transistor being coupled to the power supply and applying said second control potential thereto to hold the transmitter energized for said predetermined time duration.

10. A control system responsive to a first control potential for providing a second control potential which starts at the termination of the first control potential and continues for a predetermined time duration, said control system including in combination, semiconductor means having input and output electrodes, a transformer having a saturable core and first, second and third windings thereon, means coupled to said first winding for applying the first control potential thereto to saturate said core in one direction, said second winding being coupled to said input electrode of said semiconductor means and applying a voltage thereto for rendering the same conducting in response to termination of said first control potential, said third winding being coupled to said output electrode of said semiconductor means and providing regenerative action through said second winding to cause said semiconductor means to remain conducting until said transformer core is saturated in the opposite direction, and means applying a potential to said semiconductor means, so that said semiconductor means when conducting provides a second control potential at said output electrode thereof which continues for the predetermined time duration.

11. A control system responsive to a first control potential for providing a second control potential which is initiated at the termination of the first control potential and continues for a predetermined time duration, said control system including in combination, a transistor having base, emitter and collector electrodes, a transformer having a saturable core and first, second and third windings thereon, means for applying the first control potential to said first winding to saturate said core in a first direction, said second winding being coupled to said base electrode of said transistor for applying a voltage thereto for rendering the same conducting in response to termination of said first control potential, capacitor means connected between said base and emitter electrodes of said transistor for preventing conduction of said transistor until a predetermined voltage is applied to said base electrode thereof, and means connected to said emitter electrode of said transistor for applying a potential thereto so that a second control potential appears at said collector electrode when said transistor conducts, said transformer including a third winding coupled to said collector electrode of said transistor and providing regenerative action through said second winding to cause said transistor to continue conduction, with the flux in said transformer core reversing until said core is saturated in the opposite direction to stop the regenerative action and cut off said transistor so that said second control potential appears at said collector electrode for the predetermined time duration while said transistor conducts.

12. A control system responsive to a first control potential for providing a second control potential which is actuated at the termination of the first control potential and continues for a predetermined time duration, said control system including in combination, a transistor having base, emitter and collector electrodes, a transformer having a saturable core and first, second and third windings thereon, means for applying the first control potential to said first winding to saturate said core in a first direction, said second winding being coupled to said base electrode of said transistor for applying a voltage thereto for rendering the same conducting in response to termination of said first control potential, rectifier means connected between said base and emitter electrodes of said transistor and poled to conduct in a direction opposite to conduction between said base and emitter electrodes, and means connected to said emitter electrode of said transistor for applying a potential thereto so that a second control potential appears at said collector electrode when said transistor conducts, said transformer including a third winding coupled to said collector electrode of said transistor and providing regenerative action through said second winding to cause said transistor to continue conduction, with the flux in said transformer core reversing until said core is saturated in the opposite direction to stop the regenerative action and cut off said transistor, so that said second control potential appears at said collector electrode for the predetermined time duration while said transistor conducts.

References Cited by the Examiner

UNITED STATES PATENTS

| | | | |
|---|---|---|---|
| 2,974,221 | 3/1961 | Peth | 325—55 X |
| 3,018,389 | 1/1962 | Herscher | 307—88.5 |

DAVID G. REDINBAUGH, *Primary Examiner.*

B. V. SAFOUREK, *Assistant Examiner.*